(12) United States Patent
Brant et al.

(10) Patent No.: US 9,292,437 B2
(45) Date of Patent: Mar. 22, 2016

(54) OPTIMIZING VIRTUAL MEMORY ALLOCATION IN A VIRTUAL MACHINE BASED UPON A PREVIOUS USAGE OF THE VIRTUAL MEMORY BLOCKS

(75) Inventors: Charles D. Brant, Raleigh, NC (US); Esther M. Burwell, Durham, NC (US); Robert L. Orr, Raleigh, NC (US); Troy M. Volin, Chapel Hill, NC (US); Douglas A. Wood, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1497 days.

(21) Appl. No.: 12/165,931

(22) Filed: Jul. 1, 2008

(65) Prior Publication Data

US 2010/0005222 A1 Jan. 7, 2010

(51) Int. Cl.
G06F 12/00 (2006.01)
G06F 13/00 (2006.01)
G06F 13/28 (2006.01)
G06F 3/06 (2006.01)
G06F 12/08 (2006.01)
G06F 9/455 (2006.01)

(52) U.S. Cl.
CPC .............. *G06F 12/08* (2013.01); *G06F 3/061* (2013.01); *G06F 3/0611* (2013.01); *G06F 3/0631* (2013.01); *G06F 9/45558* (2013.01); *G06F 3/0676* (2013.01); *G06F 2009/45583* (2013.01); *G06F 2212/1016* (2013.01)

(58) Field of Classification Search
None
See application file for complete search history.

(56) References Cited

U.S. PATENT DOCUMENTS

| 7,296,139 | B1 * | 11/2007 | Case et al. | 711/209 |
| 2006/0064697 | A1 * | 3/2006 | Kagi et al. | 718/103 |
| 2006/0206891 | A1 * | 9/2006 | Armstrong et al. | 718/1 |

* cited by examiner

*Primary Examiner* — Jared Rutz
*Assistant Examiner* — Marwan Ayash
(74) *Attorney, Agent, or Firm* — Patents on Demand P.A.; Brian K. Buchheit; Scott M. Garrett

(57) ABSTRACT

The allocation of virtual memory within a virtual machine based upon the previous mapping of virtual memory blocks to physical memory blocks is optimized. Virtual memory blocks that have been mapped to a corresponding physical memory block over virtual memory blocks that are unmapped when fulfilling an allocation request can be reallocated preferentially.

15 Claims, 2 Drawing Sheets

OPTIMIZING VIRTUAL MEMORY ALLOCATION IN A VIRTUAL MACHINE BASED UPON A PREVIOUS USAGE OF THE VIRTUAL MEMORY BLOCKS

BACKGROUND OF THE INVENTION

The present invention relates to the field of virtual memory management and, more particularly, to optimizing the allocation of virtual memory in a virtual machine based upon the previous mapping of the virtual memory blocks.

Virtual machines provide a variety of critical functions for computing networks. Since multiple virtual machines can operate on a single physical machine, virtual machines increase the flexibility of the network without as great an increase in cost and overhead as incorporating additional physical machines. However, coordinating the allocation of virtual memory with the corresponding physical memory of the physical machine often results in decreasing the effectiveness of using virtual machines.

The allocation algorithms used by conventional virtual memory allocators tend only to focus on the availability of the virtual memory blocks. As such, additional overhead is generated during allocation when the allocation algorithm selects virtual memory blocks that are available and have not been previously used by the virtual machine to fulfill a previous request. Because the selected available virtual memory blocks have not been previously used, the virtual memory block may not have been pre-allocated by the hypervisor or management mechanism. This translates into a delay in the writing of data by the requestor while the allocation is resolved between the virtual and physical memory.

Thus, these delays increase exponentially with the number of virtual machines running on the physical machine and the quantity of allocation requests generated by their processes and/or applications. Conventional virtual memory allocation approaches, therefore, limit the overall effectiveness of virtual machines.

BRIEF SUMMARY OF THE INVENTION

One aspect of the present invention can include a computer program product for optimizing the allocation of virtual memory within a virtual machine based upon the previous mapping of virtual memory blocks to physical memory blocks. Such a computer program product can include a computer usable medium having computer usable program code. The computer usable program code can be configured to preferentially reallocate virtual memory blocks that have been mapped to a corresponding physical memory block over virtual memory blocks that are unmapped when fulfilling an allocation request.

Another aspect of the present invention can include a method for optimizing the allocation of virtual memory within a virtual machine based upon the previous mapping of the virtual memory blocks. An allocation request for a specified quantity of virtual memory blocks can be received by a virtual machine operating on a client device. A fulfillment of the allocation request can be determined from virtual memory blocks that are available for allocation. The determination can give preferentially treatment to those virtual memory blocks having a mapped usage status. The specified quantity of virtual memory blocks can be provided from the available virtual memory blocks responsive to the received request.

Yet another aspect of the present invention can include a system that optimizes the allocation of virtual memory within a virtual machine based upon the previous mapping of the virtual memory blocks. Such a system can include a set of virtual memory blocks and an optimized memory allocator of a virtual machine. The set of virtual memory blocks can correspond to a physical memory blocks of the client device running the virtual machine. The optimized memory allocator can be configured to optimize the allocation of available virtual memory blocks in response to allocation requests. Available virtual memory blocks that have been previously mapped by the virtual machine can be given preference to fulfill the allocation request.

DETAILED DESCRIPTION OF THE INVENTION

Figure 1:
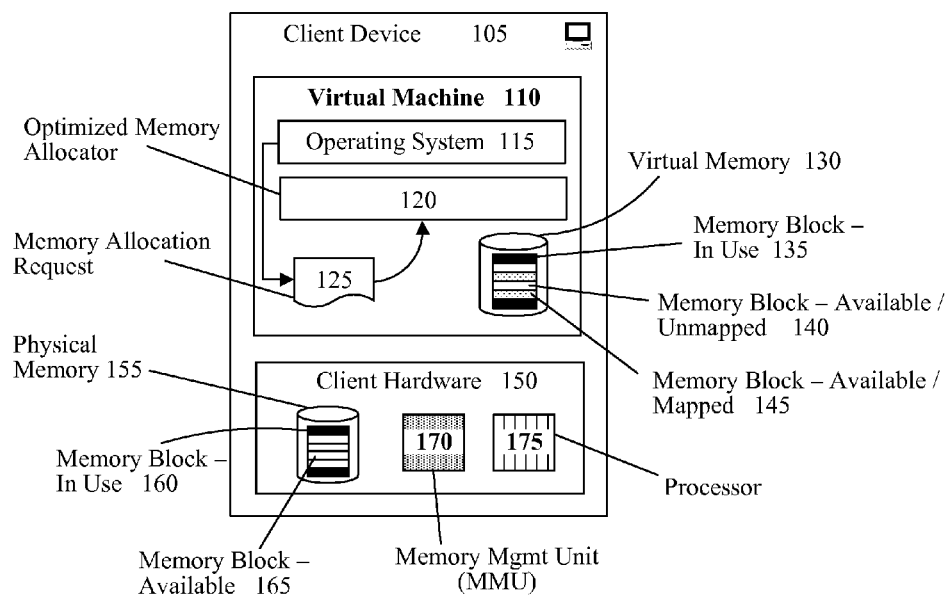
FIG. 1 is a schematic diagram illustrating a system for optimizing the allocation of virtual memory within a virtual machine based upon the previous mapping of the virtual memory blocks in accordance with embodiments of the inventive arrangements disclosed herein.

The present invention discloses a solution that optimizes the allocation of virtual memory within a virtual machine by tracking the previous mapping of virtual memory blocks. The virtual memory can be associated with any type of physical memory, which includes volatile and non-volatile storage mediums (e.g., RAM, disks, and any other form of memory). Elements supporting a usage-based optimization algorithm can be incorporated into the memory allocator of the virtual machine. These elements can include the usage-based optimization algorithm, a usage status table, and a usage status monitor. The usage status monitor and table can track the usage status of the virtual memory blocks of the virtual machine. The usage status can indicate if a virtual memory block has been previously mapped by the virtual machine. When the existing allocation algorithm of the memory allocator executes to fulfill an allocation request, the usage-based optimization algorithm can be employed to give available virtual memory blocks having a mapped usage status preference for fulfilling the allocation request. Additionally, the usage status monitor can convert virtual memory blocks that are unmapped into mapped virtual memory blocks as needed when the virtual machine is in an idle state.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized, which include volatile and non-volatile storage mediums. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 100 for optimizing the allocation of virtual memory 130 within a virtual machine 110 based upon the previous mapping of the virtual memory blocks in accordance with embodiments of the inventive arrangements disclosed herein. In system 100, the optimized memory allocator 120 can fulfill a memory allocation request 125 from the operating system 115 of the virtual machine 110 with available virtual memory blocks 140 and 145 that have been further classified by whether the blocks have or have not been mapped by the virtual machine 110.

It should be noted that the client device 105 and virtual machine 110 of system 100 can include additional components whose operation can be supportive of the present invention and/or can implement other functions that are unaffected by and/or unrelated to the present invention. As such, only the components of the client device 105 and virtual machine 110 that pertain to the present invention have been included in system 100.

The client device 105 can be a computing device capable of running the virtual machine 110, such as a server, personal computer, and the like. The client device 105 can include a variety of client hardware elements 150, such as physical memory 155, a memory management unit (MMU) 170, and processor 175. The processor 175 can represent a central processing unit (CPU) capable of executing machine-readable instructions upon the client device 105.

The MMU 170 can be a hardware component used by the processor 175 that calculates the address in physical memory 155 that corresponds to a given address of virtual memory 130. The physical memory 150 can represent primary memory storage devices, such as Random Access Memory (RAM), as well as secondary memory storage devices such as hard drives, or a combination of both. For example, infrequently used data in RAM can be transferred to the swap table of a hard drive for later access. In other words, the physical memory 150 can represent any volatile or non-volatile storage medium for digitally encoded data.

Physical memory 155 can be abstractly represented as a multitude of storage blocks. During the operation of the client device 105, the blocks of physical memory 155 can be in use 160 or available for use 165.

The virtual machine 110 can represent a software application that simulates the operation of a separate computing environment. As such, the virtual machine 110 can simulate a computing environment foreign to that of the client device 105. For example, a client device 105 with a Microsoft® Windows® operating environment can run a virtual machine 110 of a Linux® operating environment (Microsoft and Windows are registered trademarks of Microsoft Corporation in the United States, other countries or both; and Linux is a registered trademark of Linus Torvalds in the United States, other countries or both).

The virtual machine 110 can include an operating system 115, an optimized memory allocator 120, and virtual memory 130. The operating system 115 can represent a simulated software operating system that would run on a physical client device 105. As such, the operating system 115 can be configured to simulate the execution of system commands for the virtual machine 110.

These system commands can be generated internally by the operating system 115 or by other software applications (not shown) being run by the virtual machine 110. Of particular note is a memory allocation request 125. A memory allocation request 125 within a virtual machine 110 cannot be handled directly by the client device 105. Usage of virtual memory 130 can be coordinated with the corresponding physical memory 155 by the optimized memory allocator 120.

The optimized memory allocator 120 can correspond to the component of the virtual machine 110 that handles the allocation of virtual memory 130 for memory allocation requests 125. In addition to tracking the availability of virtual memory 130 to fulfill an allocation request 125, the optimized memory allocator 120 can be configured to further optimize the selection of virtual memory 130 based upon whether an available virtual memory block is unmapped 140 or mapped 145 to a corresponding physical memory block 155 by the virtual machine 110.

Preference for fulfilling a memory allocation request 125 can be given to those virtual memory blocks that are available and mapped 145. Reallocating virtual memory blocks that are already mapped 145 first when fulfilling a memory allocation request 125 can be more efficient than using memory blocks that are unmapped 140.

Virtual memory blocks that are unmapped 140 can still require coordination between the virtual machine 110 and client device 105 in regards to the physical memory 155, which requires additional time for processing before data can be written into the designated virtual memory 130. Virtual memory blocks that are mapped 145 already have a corresponding physical memory block 160 assigned to them and, therefore, do not require the additional time for coordination.

The optimized memory allocator 120 can also include the capability to convert unmapped virtual memory blocks 140 to mapped virtual memory blocks 145. A preset number of virtual memory blocks can be converted until all virtual memory blocks are mapped 145 to physical memory blocks 155.

In another embodiment, multiple virtual machines 110, each with an optimized memory allocator 120, can function on a single client device 105. In such a configuration, a hypervisor (not shown) can be utilized as an allocation mediator between each optimized memory allocator 120 and the client device 105.

It should be noted that the functionality described for the optimized memory allocator 120 is in addition to the basic functions performed by a typical memory allocator, such as tracking the availability of virtual memory blocks 130. That is, the described optimization adds a level of efficiency to a typical memory allocator. It is also important to emphasize that the typical memory allocator does not track the previous mapping of virtual memory 130.

Figure 2:
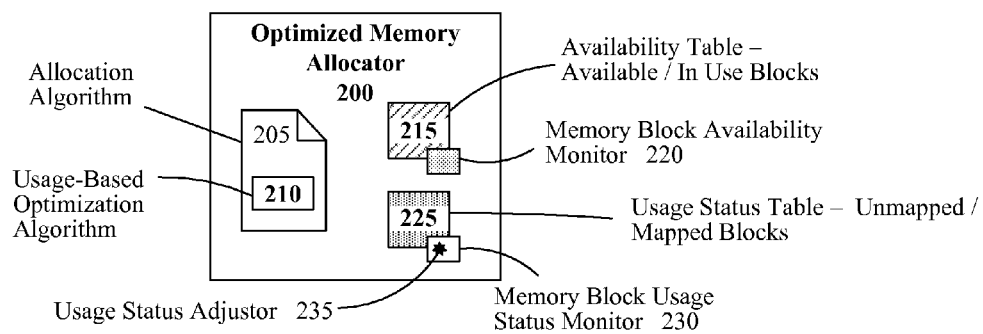
FIG. 2 is a schematic diagram detailing the composition of an optimized memory allocator in accordance with an embodiment of the inventive arrangements disclosed herein.

FIG. 2 is a schematic diagram detailing the composition of an optimized memory allocator 200 in accordance with an embodiment of the inventive arrangements disclosed herein. The optimized memory allocator 200 can be utilized by system 100 or any other virtual machine supporting the optimization of virtual memory allocation based upon previous usage.

The optimized memory allocator 200 can include an allocation algorithm 205, an availability table 215, a memory block availability monitor 220, a usage status table 225, and a memory block usage status monitor 230. The allocation algorithm 205 can represent the set of machine-readable instructions expressing how the allocation of virtual memory is to be conducted by the optimized memory allocator 200.

An allocation algorithm 205 can use a memory block availability monitor 220 to track the availability of virtual memory blocks. The availability of the virtual memory blocks can be stored in the availability table 215. Typically, when handling an allocation request, the allocation algorithm 205 first determines if enough available blocks of virtual memory exist to fulfill the request. This can be done by querying the availability table 215.

The allocation algorithm 205 can then check the available virtual memory blocks against the usage status table 225 using the usage-based optimization algorithm 210. The usage-based optimization algorithm 210 can contain the machine-readable instructions expressing the preferential treatment of virtual memory blocks that are already mapped to physical memory blocks.

The usage-based optimization algorithm 210 can utilize a memory block usage status monitor 230 to track the usage status of virtual memory blocks. The usage status can be an identifier stored within the usage status table 225 that indicates if a virtual memory block is mapped or unmapped. Utilizing the data of the usage status table 225, the usage-based optimization algorithm 210 can attempt to focus the pool of available virtual memory blocks to those that have a usage status of mapped.

The usage status monitor 230 can include a usage status adjustor 235 for the purpose of converting unmapped virtual memory blocks to the mapped usage status. The status adjustor 235 can be configured to convert a predetermined amount of unmapped available virtual memory blocks when the quantity of mapped memory blocks is reduced below a preset threshold. For example, when the quantity of mapped available virtual memory blocks falls below five, the usage status adjustor 235 can convert four unmapped virtual memory blocks.

The conversion of virtual memory blocks can be performed by writing a predefined block of data into a designated available and unmapped virtual memory block. The usage status adjustor 235 can be configured to perform the conversion of virtual memory blocks during the idle time of the virtual machine. Thus, the idle time of the virtual machine can be used to coordinate the allocation of unmapped virtual memory blocks. In turn, this increases the quantity of mapped virtual memory blocks that the usage-based optimization algorithm 210 can use to fulfill allocation requests.

Additionally, the allocation algorithm 205 can also include logic that can bypass the usage-based optimization algorithm 210. Bypassing the usage-based optimization algorithm 210 can occur based upon an environmental constraint and/or a user-selectable configuration of the virtual machine. For example, a high level of CPU usage by the virtual machine can be evaluated as a bypass condition by the optimized memory allocator 200 when executing the allocation algorithm 205.

In another contemplated embodiment, the usage-based optimization algorithm 210 can exist separately from the allocation algorithm 205. The allocation algorithm 205 can then be modified to call the usage-based optimization algorithm 210.

Figure 3:
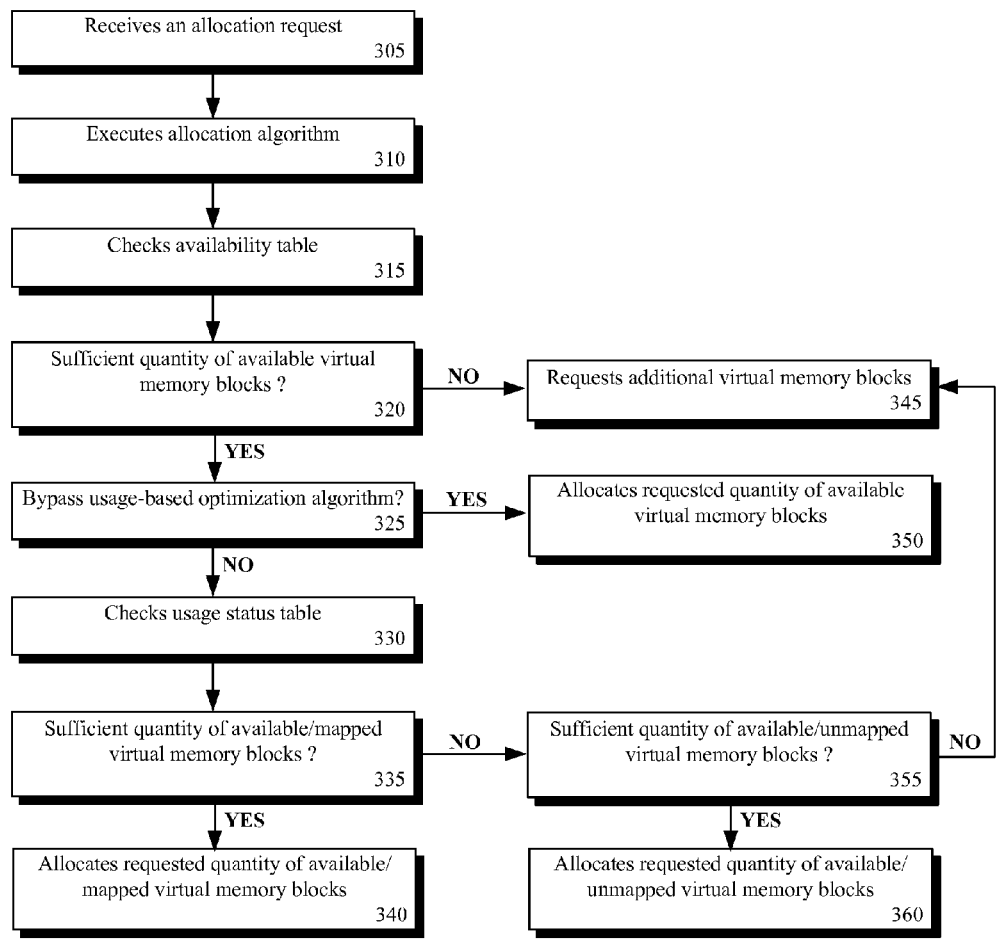
FIG. 3 is a flow chart of a method optimizing the allocation of virtual memory within a virtual machine based upon the previous mapping of the virtual memory blocks in accordance with an embodiment of the inventive arrangements disclosed herein.

FIG. 3 is a flow chart of a method 300 optimizing the allocation of virtual memory within a virtual machine based upon the previous mapping of the virtual memory blocks in accordance with an embodiment of the inventive arrangements disclosed herein. Method 300 can be performed in the context of system 100 and/or utilizing the optimized memory allocator 200 of FIG. 2.

Method 300 can begin with step 305 where the optimized memory allocator can receive an allocation request. In step 310, the allocation algorithm can be executed. The availability table can be checked in step 315.

In step 320, it can be determined if there is a sufficient quantity of available virtual memory blocks to fulfill the allocation request. When the quantity of available virtual memory blocks is insufficient, additional virtual memory blocks can be requested in step 345.

When the quantity of available virtual memory blocks is sufficient, it can be determined if the usage-based optimization algorithm is to be bypassed in step 325. When the usage-based optimization algorithm is to be bypassed, step 350 can execute where the optimized memory allocator allocates the requested quantity of available virtual memory blocks to the allocation request. It should be noted that the allocation of step 350 is not based on the previous mapping of the virtual memory blocks and that the virtual memory blocks can be arbitrarily allocated by the allocation algorithm.

When the usage-based optimization algorithm is not to be bypassed, step 330 can execute where the usage status table can be checked. It can be determined if a sufficient quantity of available and mapped virtual memory blocks exists to fulfill the allocation request in step 335.

When a sufficient quantity of available and mapped virtual memory blocks exists, step 340 can execute where the optimized memory allocator allocates the requested quantity of available and mapped virtual memory blocks to the allocation request. When an insufficient quantity of available and mapped virtual memory blocks exists, it can be determined if a sufficient quantity of available and unmapped virtual memory blocks exists in step 355.

When a sufficient quantity of available and unmapped virtual memory blocks exists, step 360 can execute where the optimized memory allocator allocates the requested quantity of available and unmapped virtual memory blocks to the allocation request. When an insufficient quantity of available and unmapped virtual memory blocks exists, additional virtual memory blocks can be requested in step 345.

The diagrams in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product stored in a non-transitory storage medium containing a plurality of instructions, which upon execution by at least one processor cause at least one computer to optimize the allocation of virtual memory within a virtual machine based upon the previous mapping of virtual memory blocks to physical memory blocks, the computer program product comprising:

a non-transitory computer usable storage medium having computer usable program code embodied therewith, the computer usable program code upon execution by at least one processor causes at least one computer to:

receive an allocation request for a specified quantity of virtual memory blocks by the virtual machine operating on a client device;

access an availability table of the virtual machine to identify available virtual memory blocks;

determine a usage status of the identified available virtual memory blocks using a usage status table of the virtual machine, wherein the usage status table is configured to store at least one of a mapped usage status or an unmapped usage status;

determine whether the specified quantity of virtual memory blocks having a mapped usage status is present;

when the specified quantity of available virtual memory blocks having a mapped usage status is present, allocate the specified quantity of virtual memory blocks from the available virtual memory blocks having mapped usage status;

when the specified quantity of available virtual memory blocks having a mapped usage status is not present, allocate the specified quantity of virtual memory blocks from the available virtual memory blocks having unmapped usage status; and track the usage status of the available virtual memory blocks in the usage status table and to automatically convert a preset quantity of virtual memory blocks of the unmapped usage status into virtual memory blocks of the mapped usage status, during an idle time of the virtual machine, when a quantity of virtual memory blocks of the mapped usage status is reduced below a predetermined threshold value.

2. The computer program product of claim 1, further comprising:

computer usable program code of the computer usable storage medium configured to record a mapping of a plurality of virtual memory blocks to a corresponding plurality of physical memory blocks for use by the virtual machine operating on the client device, as the usage status in the usage status table.

3. A method for optimizing the allocation of virtual memory within a virtual machine based upon the previous mapping of the virtual memory blocks, the method comprising:

receiving, via computing equipment executing software stored on at least one non-transitory storage medium, an allocation request for a specified quantity of virtual memory blocks by the virtual machine operating on a client device, comprising hardware;

accessing, via computing equipment executing software stored on at least one non-transitory storage medium, an availability table of the virtual machine to identify available virtual memory blocks;

determining, via computing equipment executing software stored on at least one non-transitory storage medium, presence of a bypass condition, wherein the bypass condition is based on at least one of an environmental constraint and a user-selectable configuration;

responsive to determining absence of the bypass condition, performing, via computing equipment executing software stored on at least one non-transitory storage medium, usage based optimization comprising:

determining a usage status of the identified available virtual memory blocks using a usage status table of the virtual machine, wherein the usage status table is configured to store at least one of a mapped usage status or an unmapped usage status determining whether the specified quantity of virtual memory blocks having a mapped usage status is present;

when the specified quantity of available virtual memory blocks having a mapped usage status is present, allocating the specified quantity of virtual memory blocks from the available virtual memory blocks having mapped usage status when the specified quantity of available virtual memory blocks having a mapped usage status is not present, allocating the specified quantity of virtual memory blocks from the available virtual memory blocks having unmapped usage status; and responsive to determining presence of the bypass condition bypassing, via computing equipment executing software stored on at least one non-transitory storage medium, performing the usage based optimization and allocating the specified quantity of virtual memory blocks from the available virtual memory blocks.

4. The method of claim 3, further comprising:

tracking, via computing equipment executing software stored on at least one non-transitory storage medium, the usage status of the available virtual memory blocks in the usage status table.

5. The method of claim 4, wherein allocating the specified quantity of virtual memory blocks further comprises:

comparing, via computing equipment executing software stored on at least one non-transitory storage medium, the specified quantity of the allocation request against a quantity of virtual memory blocks from a list of available virtual memory blocks of the mapped usage status; and when the quantity of available and mapped virtual memory blocks is sufficient to fulfill the specified quantity of the allocation request, utilizing, via computing equipment executing software stored on at least one non-transitory storage medium, said quantity of available and mapped virtual memory blocks as the fulfillment of the allocation request.

6. The method of claim 5, further comprising:

when the quantity of available and mapped virtual memory blocks is insufficient to fulfill the specified quantity of the allocation request, comparing, via computing equipment executing software stored on at least one non-transitory storage medium, the specified quantity of the allocation request against a quantity of virtual memory blocks from a list of available virtual memory blocks of the unmapped usage status; and when the quantity of available and unmapped virtual memory blocks is sufficient to fulfill the specified quantity of the allocation request, utilizing, via computing equipment executing software stored on at least one non-transitory storage medium, said available and unmapped virtual memory blocks as the fulfillment of the allocation request, wherein said utilization of available and unmapped virtual memory blocks requires an allocation of a corresponding physical memory block to the virtual machine by the client device.

7. The method of claim 4, wherein tracking the usage status for the plurality of the available virtual memory blocks in the usage status table further comprises:

monitoring, via computing equipment executing software stored on at least one non-transitory storage medium, a quantity of virtual memory blocks for each usage status; and when a quantity of virtual memory blocks of the mapped usage status is reduced below a predetermined threshold value, automatically converting, via computing equipment executing software stored on at least one non-transitory storage medium, a preset quantity of virtual memory blocks of the unmapped usage status into virtual memory blocks of the mapped usage status, wherein said reduction in the quantity of virtual memory blocks of the mapped usage state is caused by fulfilling allocation requests.

8. The method of claim 7, wherein automatically converting a preset quantity of virtual memory blocks of the unmapped usage status into virtual memory blocks of the mapped usage status further comprises:
   allocating, via computing equipment executing software stored on at least one non-transitory storage medium, the preset quantity of virtual memory blocks of the unmapped usage status to the virtual machine;
   writing, via computing equipment executing software stored on at least one non-transitory storage medium, data into each virtual memory block of said preset quantity of virtual memory blocks; and
   releasing, via computing equipment executing software stored on at least one non-transitory storage medium, said preset quantity of virtual memory blocks, wherein the usage status of said preset quantity of virtual memory blocks is changed to the mapped usage status.

9. The method of claim 7, wherein automatically converting a preset quantity of virtual memory blocks of the unmapped usage status into virtual memory blocks of the mapped usage status is executed when the virtual machine is determined to be in an idle state.

10. The method of claim 7, wherein a hypervisor is used to handle assigning virtual memory blocks to the plurality of virtual machines from a plurality of physical memory blocks of the client device.

11. A system comprising hardware, that optimizes the allocation of virtual memory within a virtual machine based upon the previous mapping of the virtual memory blocks, the virtual machine comprising:
   a plurality of virtual memory blocks, represented by computer readable code stored within at least one non-transitory storage medium, corresponding to a plurality of physical memory blocks of a client device;
   an availability table, stored within at least one non-transitory storage medium, configured to store availability of the plurality of virtual memory blocks;
   a usage status table, stored within at least one non-transitory storage medium, configured to store a usage status of the plurality of virtual memory blocks, wherein the usage status includes at least one of a mapped usage status or an unmapped usage status; and
   an optimized memory allocator of the virtual machine, said optimized memory allocator comprising a plurality of instructions stored upon at least one non-transitory storage medium, which upon execution by at least one processor cause at least one computer to:
      access the availability table to identify available virtual memory blocks;
      determine a usage status of the identified available virtual memory blocks using the usage status table, wherein the usage status table stores at least one of a mapped usage status and an unmapped usage status; and
      preferentially allocate the virtual memory blocks that are available and mapped if a requested quantity of available and mapped virtual memory blocks is present, or allocate the virtual memory blocks that are available and unmapped if a requested quantity of available and mapped virtual memory blocks is not present.

12. The system of claim 11, wherein the optimized memory allocator of the virtual machine further comprises:
   a usage monitor comprising a plurality of instructions stored upon at least one non-transitory storage medium, which upon execution by at least one processor cause at least one computer to track the usage status of the available virtual memory blocks in the usage status table;
   an allocation algorithm comprising a plurality of instructions stored upon at least one non-transitory storage medium, which upon execution by at least one processor cause at least one computer to utilize the availability table to determine the available virtual memory blocks for fulfilling the allocation request; and
   a usage-based optimization algorithm comprising a plurality of instructions stored upon at least one non-transitory storage medium, which upon execution by at least one processor cause at least one computer to operate in conjunction with the allocation algorithm to optimize a selection of the available virtual memory blocks for fulfilling the allocation request, wherein optimization of the selection is based upon the usage status of the available virtual memory blocks, wherein available virtual memory blocks of the mapped usage status are selected before available virtual memory blocks of the unmapped usage status.

13. The system of claim 11, wherein the optimized memory allocator is able to bypass the usage-based optimization algorithm based upon at least one of an operational constraint and a user-selectable configuration, wherein the allocation request is fulfilled by only the allocation algorithm.

14. The system of claim 12, wherein the usage monitor further comprises:
   a usage status adjustor comprising a plurality of instructions stored upon at least one non-transitory storage medium, which upon execution by at least one processor cause at least one computer to convert virtual memory blocks from the unmapped usage status to the mapped usage status in response to a quantity of virtual memory blocks of the mapped usage status being reduced below a predetermined threshold value.

15. The system of claim 14, wherein the conversion of virtual memory blocks by the usage status adjustor occurs when the virtual machine is determined to be in an idle state.

* * * * *